United States Patent
Layland et al.

(10) Patent No.: US 7,469,862 B2
(45) Date of Patent: Dec. 30, 2008

(54) AIRCRAFT ENGINE NACELLE INLET HAVING ACCESS OPENING FOR ELECTRICAL ICE PROTECTION SYSTEM

(75) Inventors: Michael John Layland, Bonita, CA (US); Keith Towers Brown, Bonita, CA (US)

(73) Assignee: Goodrich Corporation, Charlotte, NC (US)

( * ) Notice: Subject to any disclaimer, the term of this patent is extended or adjusted under 35 U.S.C. 154(b) by 489 days.

(21) Appl. No.: 11/111,834

(22) Filed: Apr. 22, 2005

(65) Prior Publication Data

US 2006/0237582 A1     Oct. 26, 2006

(51) Int. Cl.
    B64D 15/12     (2006.01)
(52) U.S. Cl. .............................. 244/134 D; 244/134 R
(58) Field of Classification Search ............. 244/134 R, 244/134 D, 134 B, 54
    See application file for complete search history.

(56) References Cited

U.S. PATENT DOCUMENTS

| | | | |
|---|---|---|---|
| 3,397,302 | A | 8/1968 | Hosford |
| 4,036,457 | A | 7/1977 | Volkner et al. |
| 4,518,851 | A | 5/1985 | Oppitz |
| 4,826,108 | A | 5/1989 | Briscoe et al. |
| 5,098,037 | A | 3/1992 | Leffel et al. |
| 5,248,116 | A | 9/1993 | Rauckhorst |
| 5,361,183 | A | 11/1994 | Wiese |
| 5,427,332 | A | 6/1995 | Rauckhorst, III et al. |
| 5,475,204 | A | 12/1995 | Giamati et al. |
| 5,657,951 | A | 8/1997 | Giamati |
| 6,027,075 | A | 2/2000 | Petrenko |
| 6,227,492 | B1 | 5/2001 | Schellhase et al. |
| 6,237,874 | B1 | 5/2001 | Rutherford et al. |
| 6,279,856 | B1 | 8/2001 | Rutherford et al. |
| 6,328,258 | B1 | 12/2001 | Porte |
| 6,330,986 | B1 | 12/2001 | Rutherford et al. |

(Continued)

FOREIGN PATENT DOCUMENTS

EP     0680878     11/1995

(Continued)

OTHER PUBLICATIONS

European Search Report, App. No. 06005409.5-2315, dated May 10, 2006.

(Continued)

*Primary Examiner*—Timothy D Collins
(74) *Attorney, Agent, or Firm*—Womble Carlyle

(57) ABSTRACT

An aircraft engine nacelle inlet is provided with an inlet cowling. The inlet cowling includes an inner lip, an outer lip, and a leading edge portion connecting the inner and outer lips. Heating elements are provided proximate the leading edge, either on an inside surface of the cowling or on an outside surface. An inner barrel portion and an outer barrel portion of the nacelle inlet define a space therebetween. Ice protection-related equipment such as controllers, cables, switches, connectors, and the like, may reside in this space. One or more access openings are formed in the outer barrel to enable an operator to gain access to this equipment. The inlet cowling attaches to the inner and outer barrels with its outer lip extending sufficiently far in the aft direction to cover the access opening. When the cowling is removed, the access opening is uncovered, thereby permitting access to the equipment.

14 Claims, 9 Drawing Sheets

U.S. PATENT DOCUMENTS

| | | |
|---|---|---|
| 6,725,542 B1 | 4/2004 | Maguire |
| 2005/0006529 A1 | 1/2005 | Moe et al. |

FOREIGN PATENT DOCUMENTS

| | | |
|---|---|---|
| EP | 149563 A2 | 1/2005 |
| GB | 1117843 | 6/1968 |
| GB | 1247071 | 9/1971 |
| GB | 1314162 | 4/1973 |
| GB | 2259287 | 3/1993 |

OTHER PUBLICATIONS

European Search Report, App. No. 06005410.3-2315, dated May 10, 2006.

Extended European Search Report for European Application No. 06005410.3-2315 dated Jul. 6, 2006.

US 7,469,862 B2

AIRCRAFT ENGINE NACELLE INLET HAVING ACCESS OPENING FOR ELECTRICAL ICE PROTECTION SYSTEM

RELATED APPLICATIONS

This application is related to U.S. patent application Ser. No. 11/111,835, "Aircraft Engine Nacelle Inlet Having Electrical Ice Protection System", filed even date herewith by the same inventors as the present application, and having substantially the same specification.

BACKGROUND

The invention relates to ice protection systems for aircraft, and more specifically relates to an aircraft equipped with a low power high efficiency electrical ice protection system.

The accumulation of ice on aircraft wings and other structural members in flight is a danger that is well known. Such "structural members" include any aircraft surface susceptible to icing during flight, including wings, stabilizers, rotors, and so forth. Ice accumulation on aircraft engine nacelle inlets also can be problematic. Attempts have been made since the earliest days of flight to overcome the problem of ice accumulation. While a variety of techniques have been proposed for removing ice from aircraft during flight, these techniques have had various drawbacks that have stimulated continued research activities. One approach that has been used is so-called thermal ice protection. In thermal ice protection, the leading edges, that is, the portions of the aircraft that meet and break the airstream impinging on the aircraft, are heated to prevent the formation of ice or to loosen accumulated ice. The loosened ice is blown from the structural members by the airstream passing over the aircraft.

In one form of thermal ice protection, heating is accomplished by placing an electrothermal pad(s), including heating elements, over the leading edges of the aircraft, or by incorporating the heating elements into the structural members of the aircraft. Electrical energy for each heating element is derived from a generating source driven by one or more of the aircraft engines. The electrical energy is intermittently or continuously supplied to provide heat sufficient to prevent the formation of ice or to loosen accumulating ice.

With some commonly employed thermal ice protection systems, the heating elements may be configured as ribbons, i.e. interconnected conductive segments that are mounted on a flexible backing. When applied to a wing or other airfoil surface, the segments are arranged in strips or zones extending spanwise or chordwise along the aircraft wing or airfoil. When applied to the engine inlet the heating elements can be applied either in the circumferential or radial orientation. One of these strips, known as a spanwise parting strip, is disposed along a spanwise axis which commonly coincides with a stagnation line that develops during flight. Other strips, known as chordwise parting strips, are disposed at the ends of the spanwise parting strip and are aligned along chordwise axes. Other zones, known as spanwise shedding zones, typically are positioned on either side of the spanwise parting strip at a location intermediate the chordwise parting strips.

In one preferred form of ice protection, an electrical current is transmitted continuously through the parting strips so that the parting strips are heated continuously to a temperature above 32 degrees Fahrenheit. In the spanwise shedding zones, on the other hand, current is transmitted intermittently so that the spanwise shedding zones are heated intermittently to a temperature above about 32 degrees Fahrenheit.

One problem associated with providing such electrothermal ice protection systems on the nacelle inlets of aircraft engines involves providing sufficient numbers of access openings in the inner or outer barrels of the engine inlet for accessing and servicing the heating equipment such as heater elements and associated components. Providing such access openings proximate to the leading edge of the nacelle inlet can create non-smooth interruptions or protuberances along the otherwise smooth aerodynamic surface of the engine inlet. These interruptions or protuberances can interfere with the desired natural laminar airflow into and around the engine inlets, and may contribute to the creation of unwanted noise and drag.

Therefore, there is a need for a thermal ice protection system for the nacelle inlet of an aircraft engine that provides effective ice protection action, that includes a plurality of conveniently positioned service access openings for use in servicing and maintaining the ice protection system components, and that maintains a smooth aerodynamic inlet shape that results in substantially natural laminar airflow along the critical surfaces of the inlet.

SUMMARY OF THE INVENTION

In one aspect, the present invention is directed to an aircraft engine nacelle comprising an inner support comprising an outer barrel portion and an inner barrel portion connected to the outer barrel portion; and a removable inlet cowling attachable to the inner support, the removable inlet cowling having an outer lip, an inner lip, and a leading edge extending between the outer and inner lips, and at least one ice protection electrical heater associated with the leading edge of the removable inlet cowling; wherein: the outer barrel portion has at least one service access opening therein, and the outer lip covers the service access opening, when the inlet cowling is attached to the inner and outer barrel portions.

In another aspect, the present invention is directed to a method for servicing ice protection electrical heating equipment located between an inner barrel and an outer barrel of a nacelle. The inventive method comprises removing an inlet cowling having an outer lip that normally covers at least one service access opening formed in the outer barrel to thereby uncover said at least one service access opening, said inlet cowling having been previously provided with at least one ice protection electrical heater that is connected to said ice protection electrical heating equipment; and accessing the ice protection electrical heating equipment through the at least one service access opening to thereby service the same.

In yet another aspect, the present invention is directed to a nacelle inlet for an aircraft engine nacelle having an outer barrel, the nacelle inlet comprising electrical heating means for selectively heating at least a portion of a nacelle inlet surface, and access means for selectively accessing the electrical heating means, the access means being configured to promote laminar airflow over the nacelle inlet surface. The access means may comprise at least one service access opening in the outer barrel, and a removable cowling covering the service access opening to thereby promote laminar airflow over the nacelle inlet surface.

In still another aspect, the present invention is directed to an electric ice protection system for an aircraft engine nacelle having an inner barrel and an outer barrel. The ice protection system comprises an engine inlet cowling having an outer lip configured for engagement with at least a portion of the outer barrel, an inner lip configured for engagement with at least a portion of the inner barrel, and a leading edge extending between the outer and inner lips; at least one parting strip electrical heater attached to the cowling proximate to the leading edge; and a plurality of shed zone electrical heaters arranged side by side on either side of the parting strip electrical heater, wherein the outer barrel has at least one service access opening therein, and the outer lip is configured to cover said at least one service access opening.

DETAILED DESCRIPTION

Figure 1:
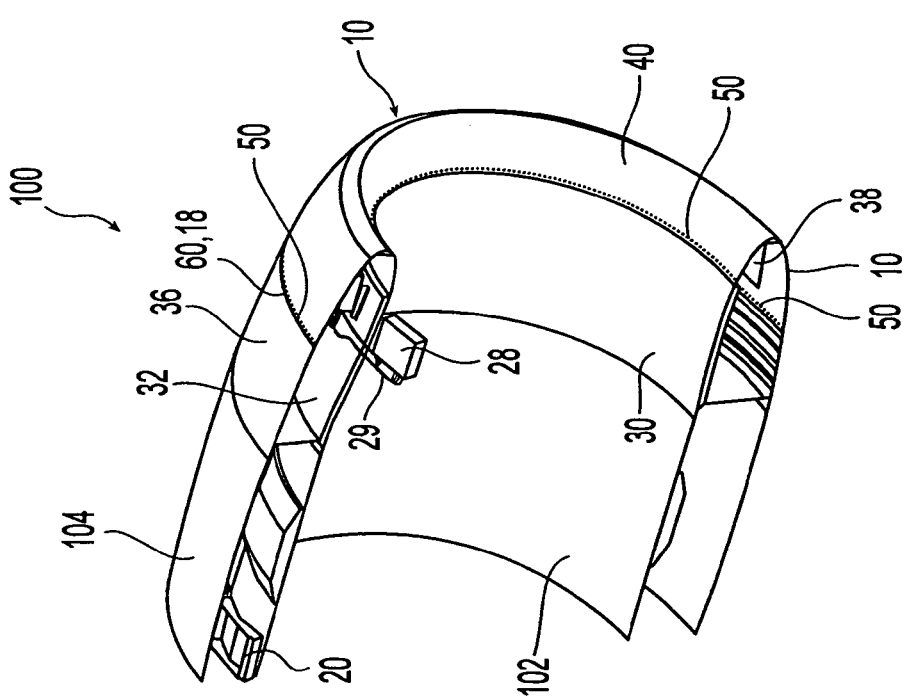
FIG. 1 is a perspective view of a portion of an aircraft engine having a nacelle inlet thermal ice protection system according to the invention.

FIG. 1 shows a portion of an aircraft engine nacelle 100 equipped with one embodiment of a nacelle inlet thermal ice protection assembly 10 according to the invention. The engine nacelle 100 includes a substantially cylindrical inner barrel 102 and a concentric outer barrel 104. The nacelle inlet assembly 10 is disposed on the forward edges of the engine's nacelle inner and outer barrels 102, 104. The nacelle inlet assembly 10 has a smooth aerodynamic shape that substantially promotes natural laminar airflow along the forwardmost surfaces of the engine nacelle 100.

Figure 2:
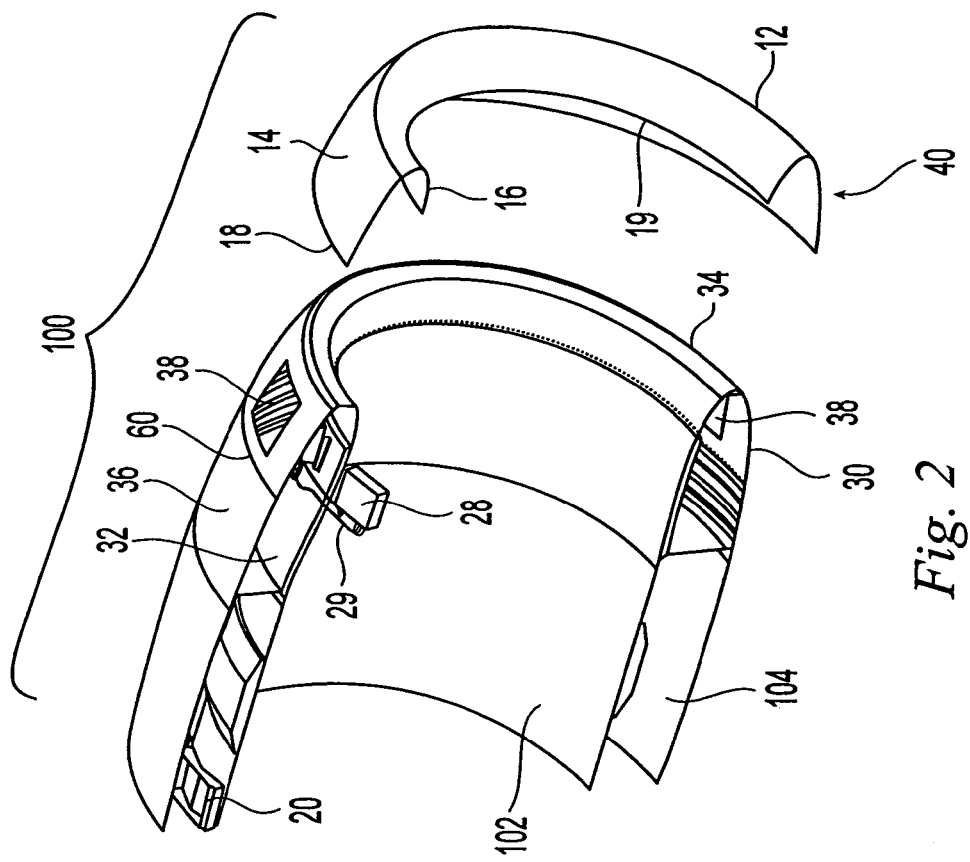
FIG. 2 is a perspective view of the aircraft engine of FIG. 1 with the inlet cowling detached.

As shown in FIG. 2, the nacelle inlet assembly 10 includes a removable inlet cowling 40. The inlet cowling 40 includes an inner lip 16, an outer lip 14, and a leading edge portion 12 connecting the two. The aft edge 18 of the outer lip 14 mates with the nacelle inlet assembly 10 along a split line 60. The aft edge 18 and split line 60 are positioned a substantial distance downstream of the leading edge portion 12, thereby providing a smooth, aerodynamic surface on the outer lip 14 between the leading edge 12 and the split line 60. The lip cowling 40 may be a single continuous 360° airfoil that covers an entire engine inlet, or may comprise a plurality of separable, arcuate cowling segments placed in a circumferential arrangement. In one embodiment, the separable cowling segments have airfoil cross-sections that are placed side by side in a circumferential arrangement.

Figure 3:
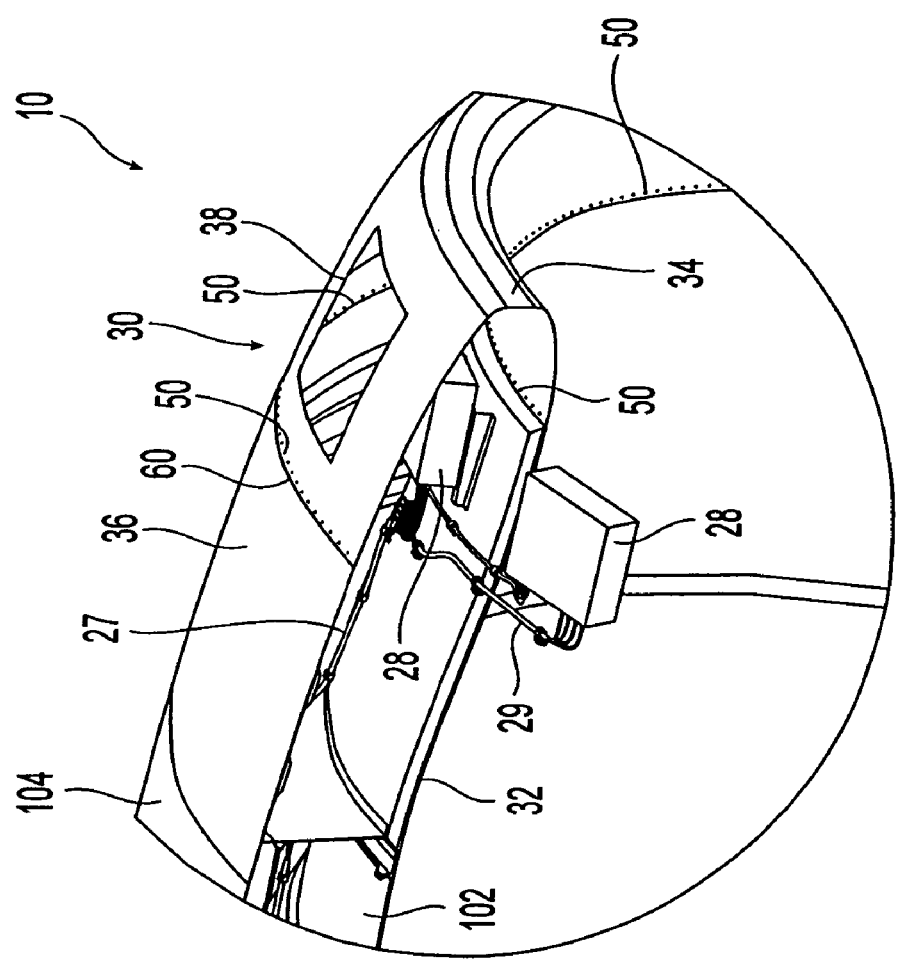
FIG. 3 is an enlarged perspective view of a forward portion of the aircraft engine of FIGS. 1 and 2.
Figure 6:
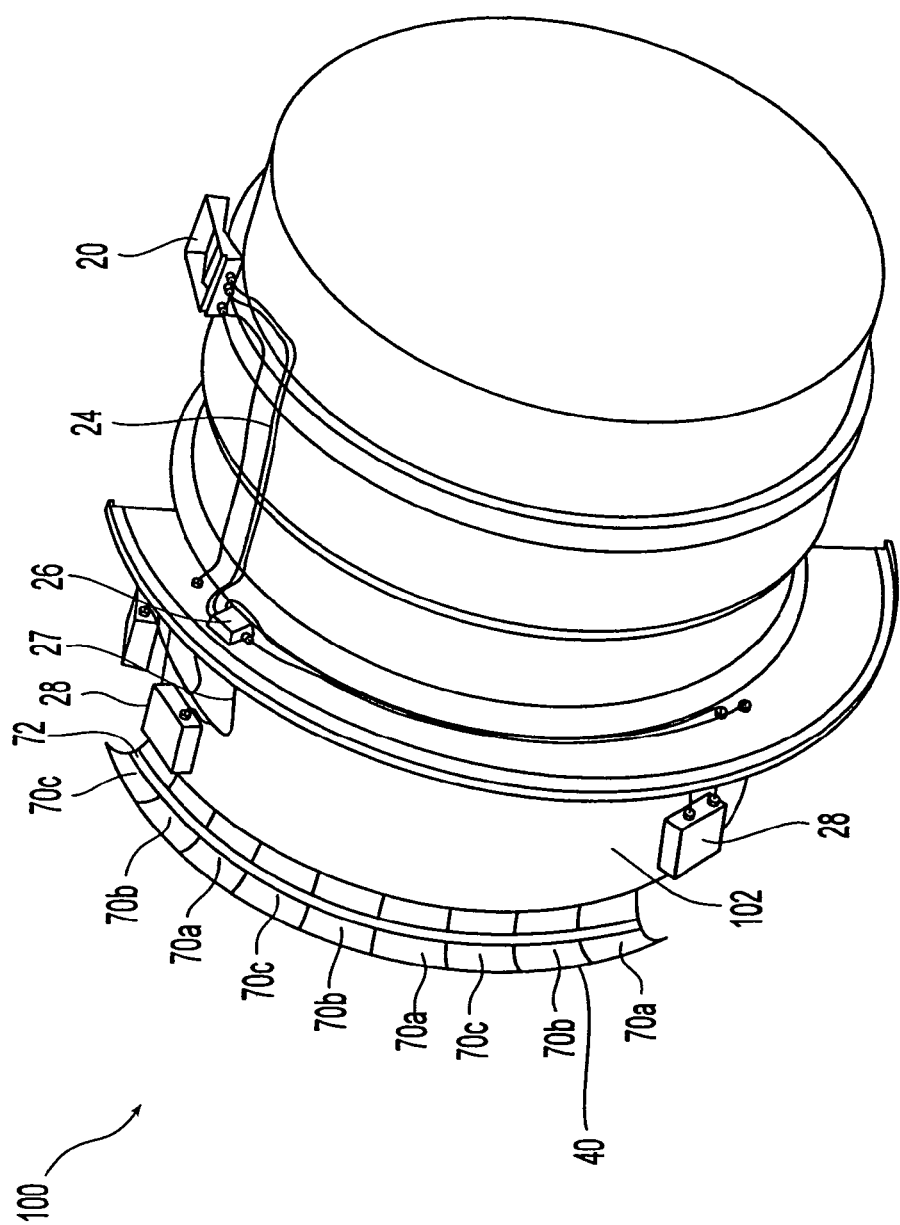
FIG. 6 is a rear perspective view of a portion of an aircraft engine showing an ice protection electrical heater arrangement on the inner surface of an inlet cowling.

As shown in FIGS. 2 and 3, the nacelle inlet assembly 10 further includes a forward support 30. The support 30 may be substantially permanently connected to the inner and outer barrels 102, 104 of the aircraft engine nacelle 100, or may be integrally constructed therewith. The forward support 30 provides strength and rigidity to the nacelle inlet assembly 10. As shown in FIG. 3, the forward support 30 includes an inner barrel portion 32, an outer barrel portion 36 and a forward wall portion 34 connecting the inner and outer barrel portions. The forward support 30 may house a plurality of spaced ice protection electrical heater switch boxes 28 for relaying electric power to the ice protection system's heaters, which are described in detail below. As shown in FIG. 6, electric power from a pylon electrical junction box 20 may be supplied to one or more control boxes 26 via power feeder harness 24, and may be supplied from the control box 26 to the heater switch boxes 28 via power supply harnesses 27.

As shown in FIGS. 2 and 3, the outer barrel portion 36 of the forward support 30 includes a plurality of circumferentially spaced service access openings 38 therethrough. Each of the service access openings 38 is located proximate to one or more associated heater switch boxes 28, and provides access to at least one of the heater switch boxes 28 from outside the outer barrel portion 36.

Figure 4:
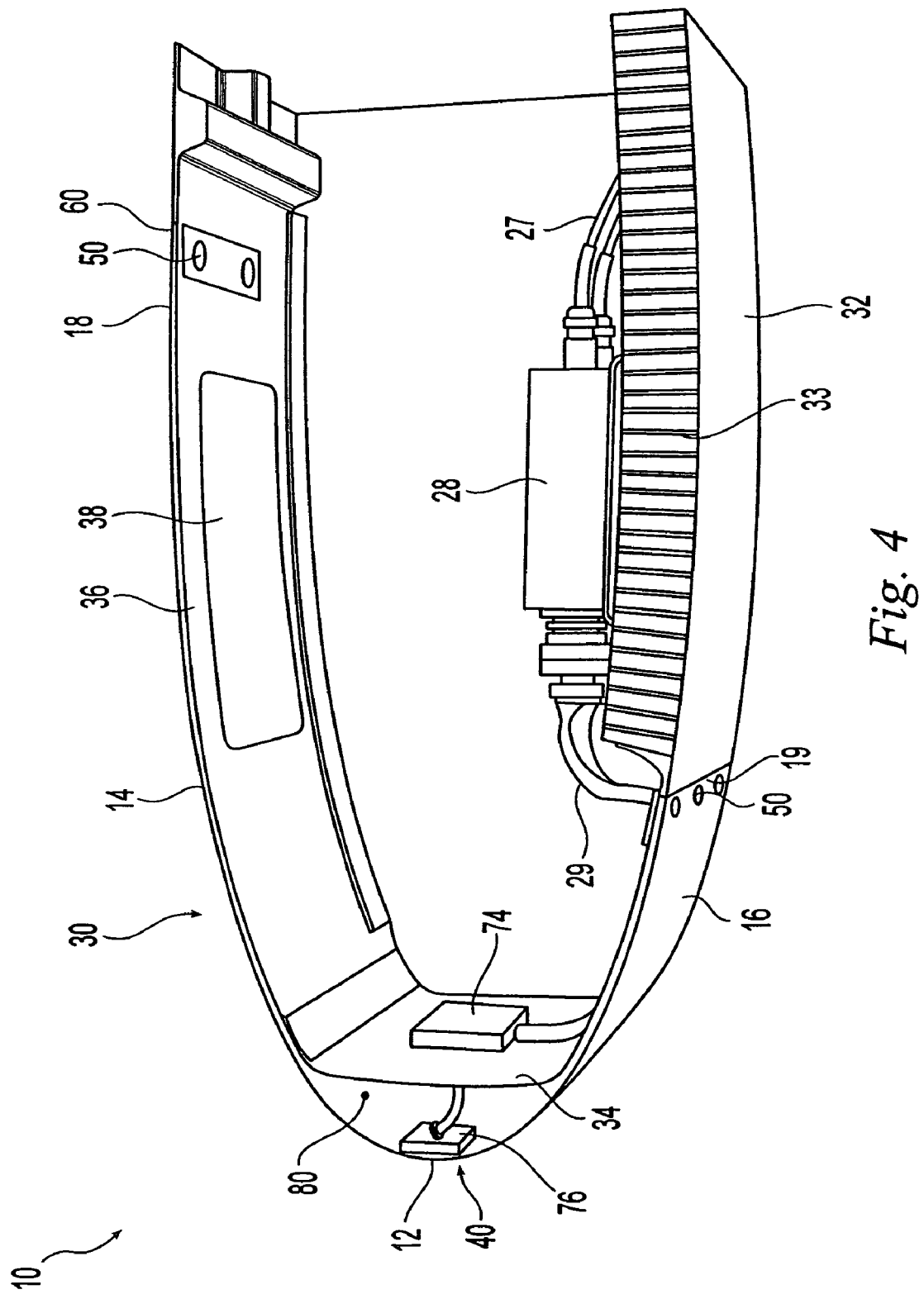
FIG. 4 is a cross-sectional view of a nacelle inlet for an aircraft engine according to the invention.

As shown in FIGS. 1 and 4, when the inlet cowling 40 is installed on the forward support 30, the outer lip 14 covers each of the respective service access openings 38 in the outer barrel portion 36 of the forward support 30. Therefore, this arrangement precludes the need for an individual cover for each service access opening 38. This arrangement also provides a continuous smooth aerodynamic lip surface 14 proximate to the leading edge 12 that helps promote natural laminar airflow across the nacelle during flight.

As shown in FIGS. 1, 2 and 3, the inlet cowling 40 is connected to the forward support 30 along both aft edges 18, 19 by pluralities of suitable removable fasteners 50. For example, the fasteners 50 may include bolts, rivets, or other suitable fasteners having substantially flush profiles. Preferably, the fasteners are of a type that is easily installed and removed by service personnel.

Figure 5:
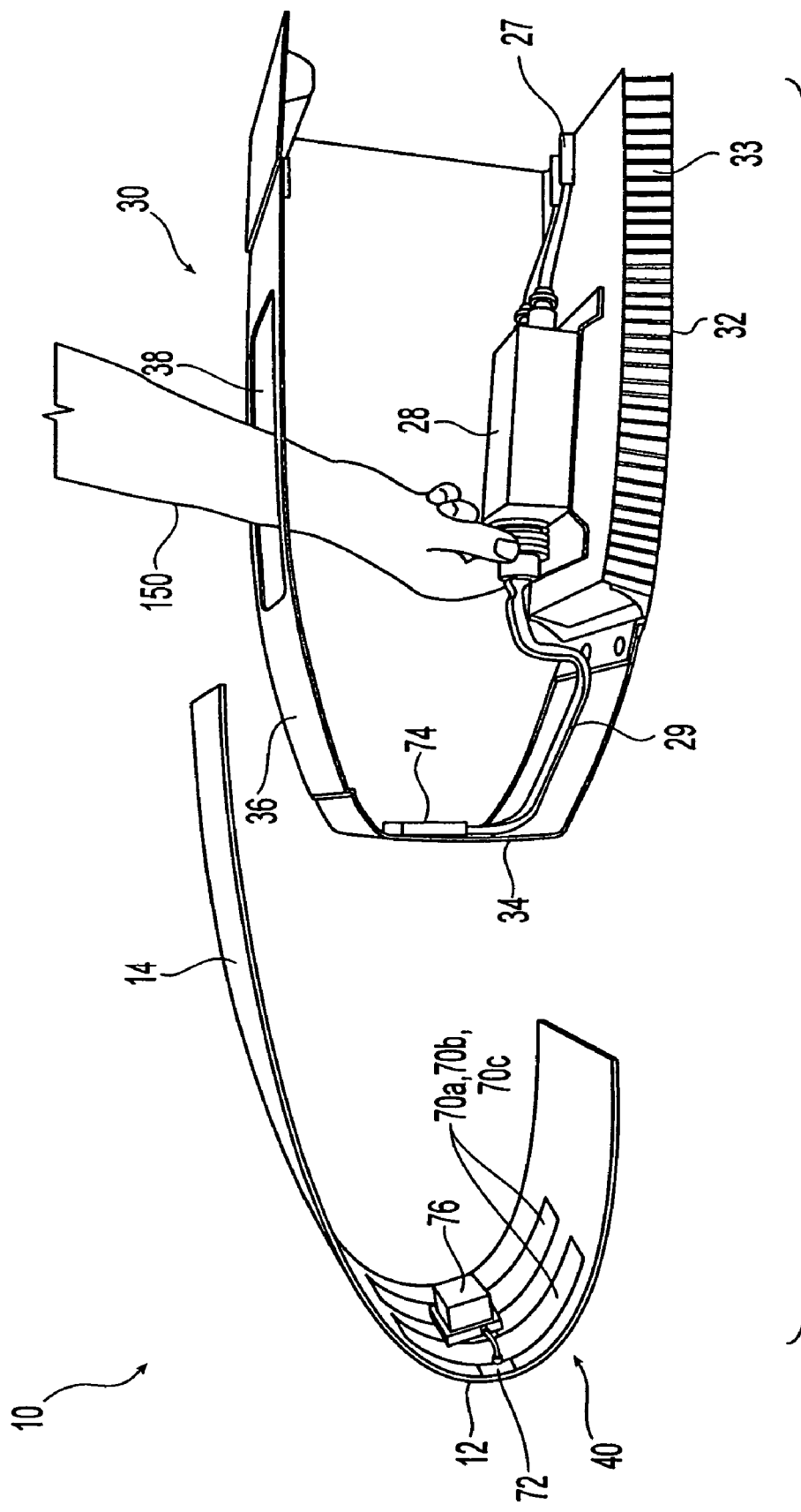
FIG. 5 is an exploded cross-sectional view of the nacelle inlet of FIG. 4 with the inlet cowling detached.

Further details of the nacelle inlet assembly 10 are shown in FIGS. 4 and 5. As shown in FIG. 4, the inlet cowling 40 substantially conforms to the shape of the forward support 30 except for a ice protection electrical heater pocket 80 formed between the leading edge 12 of the cowling 40 and the forward wall 34 of the forward support 30. The pocket 80 provides space for a plurality of ice protection ribbon heaters 70a, 70b, 70c, 72 mounted on the inner surface of the leading edge 12 of the inlet cowling 40, as well as for an electrical connector 76 which connects to electrical connector 74 mounted on the forward wall 34.

The first and second electrical connectors 74, 76 automatically connect to one another, making a plug and socket-type connection, when the inlet cowling 40 is adjusted from a first position in which it is separated from the inner and outer barrel portions to a second position in which it covers the inner and outer barrel portions. Alternatively, connectors 74 and 76 may be electrically connected (or disconnected) by manually attaching (or detaching) a cable extending between the two. Electric power is supplied to the heaters 70a, 70b, 70c, 72 from the heater switch boxes 28 via heater supply harness 29 and electrical connectors 74. In the embodiment shown, the electrical connectors 74 are mounted on the forward wall 34 of the forward support 30.

As shown in FIG. 4, the inner barrel portion 32 of the forward support 30 may include an acoustic portion 33, known to those skilled in the act, for attenuating engine noise. In the arrangement shown, the aft edge 19 of the inner lip 16 adjoins the forward support 30 at a position that is immediately forward (or upstream of) of the acoustic portion 33.

FIGS. 4 and 5 show the maintenance and service access features of the nacelle inlet assembly 10. With the inlet cowling 40 removed, the service access openings 38 are uncovered, and various ice protection electrical heating equipment such as the heater switch boxes 28, heater supply harnesses 29, power supply harnesses 27, and electrical connectors 74 can be easily accessed by service personnel extending his or her hand 150 through the service access openings 38. In addition, the removed inlet cowling 40 provides ready access to the ice protection electrical heaters 70a, 70b, 70c, 72, and associated electrical connectors 76 mounted on the inside surfaces of the cowling 40. If required, the removable inlet cowling 40 can be easily replaced with a second inlet cowling 40, and can be separated from an associated engine nacelle 100 for remote service or repair.

Figure 7:
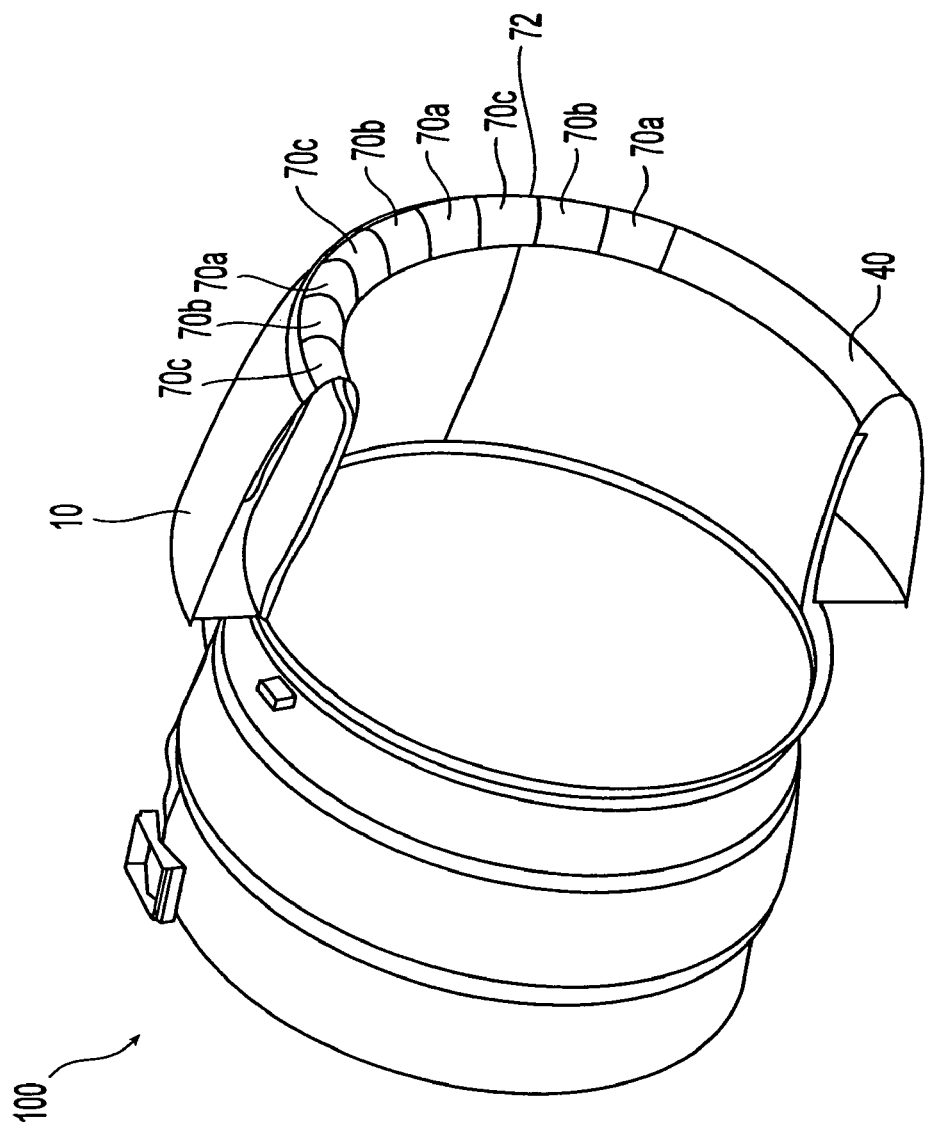
FIG. 7 is a front perspective view an inlet cowling showing the ice protection electrical heater arrangement of FIG. 6.

FIGS. 6 and 7 show one possible arrangement for the ice protection electrical heaters 70a, 70b, 70c, and 72. First, one or more parting strip heaters 72 are provided along an inner surface of the leading edge 12 of the removable cowling 40. Preferably, each parting strip heater 72 is positioned to be substantially coincident with an airflow stagnation line along the engine inlet's leading edge 12. Second, a plurality of shed zone heaters 70a, 70b, 70c are provided in substantially side by side relation along the inside surface of the leading edge 12, thereby substantially covering the entire inside surface of the leading edge 12. Although adjacent shed zone heaters may abut one another if they are electrically isolated from each other, more preferably, they are spaced apart from one another by a gap of between about 0.04" to about 0.5"; other gap spacings may also be employed. In this arrangement, power can be supplied substantially constantly to the parting strip heater(s) 72 to provide more or less continuous ice protection along the airflow stagnation line.

Power also can be intermittently supplied to the shed zone heaters 70a, 70b, and 70c to shed accumulated ice on either side of the stagnation line. In the arrangement shown, for example, pulses of electrical power may be supplied in sequence to shed zone heaters 70a, to shed zone heaters 70b, to shed zone heaters 70c, again to shed zone heaters 70a, etc. The distribution of electric power to the various heaters 70a, 70b, 70c, and 72 is controlled by one or more electrical supply control boxes 26. This cyclic rationing of electric power between the various shed zone heaters 70a, 70b, 70c acts to minimize the amount of electric power that must be derived from an aircraft's finite electrical generation capacity, while effectively providing ice protection to the engine inlet's leading edge 12.

It is understood that one may operate the heating system such that all shed zone heaters designated 70a are active for a first period of time, then all shed zone heaters designated 70b are active for a second period of time and finally all shed zone heater designated 70c are active during a third period of time. It is further understood that these three periods of time need not necessarily be of equal duration and that they need not necessarily be contiguous—i.e., there may be some intervening periods during which none of these three sets of shed zone heaters is on. It is also understood that other numbers of sets of heaters may be provided—for instance, two sets, four sets, or five sets, etc.

Figure 8:
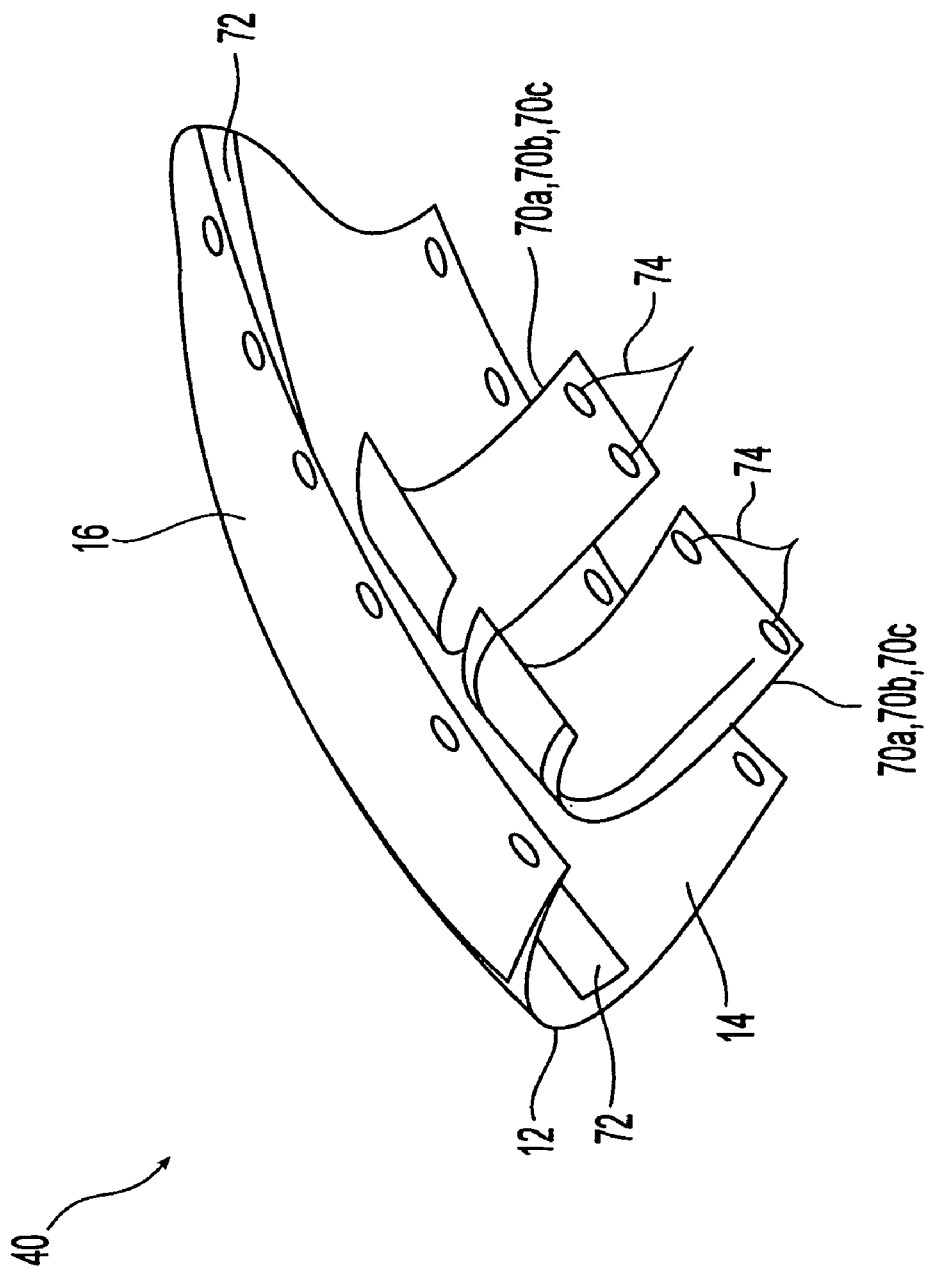
FIG. 8 is a rear perspective view of the inlet cowling of FIG. 7 showing placement of ice protection electrical heaters on an inner surface of the inlet.

FIG. 8 shows one possible arrangement for installing the heaters 70a, 70b, 70c, 72 on the inner surface of the inlet cowling 40. In this arrangement, a parting strip heater 72 is mounted on the inner surface of the lip cowling 40 proximate to the underside of the airflow stagnation line at the leading edge 12. Next, a plurality of shed zone heating pads 70a, 70b, 70c are applied over the parting strip heater 72 such that the heater pads 70a, 70b, 70c cover substantial portions of the inside surface of the leading edge 12 on each side of the parting strip heater 72. The heaters 70a, 70b, 70c, 72 may be any type of substantially flat, foil, or ribbon heater capable of supplying sufficient heat energy to the cowling 40 to effectively de-ice the cowling 40 while in service. The heating elements 70a, 70b, 70c, 72 may be configured as "ribbons", i.e. interconnected conductive sections, that are mounted on a flexible backing. For example, the low-power electric heaters 70a, 70b, 70c, 72 may be like the ice protection electrical heaters described in U.S. Pat. No. 5,475,204, assigned to Goodrich Corporation. Alternatively, the ice protection electrical heaters 70a, 70b, 70c, 72 may be like those described in U.S. patent application Ser. No. 10/840,736, filed on May 6, 2004. The disclosures of U.S. Pat. No. 5,475,204 and U.S. patent application Ser. No. 10/840,736 are hereby incorporated by reference in their entireties. And so, when in use, adjacent portions of the inlet cowling may be sequentially heated by alternatingly supplying current to the plurality of electrical ribbon heaters. Suitable electric wiring 74 supplies electric power to the ice protection electrical heaters 70a, 70b, 70c, 72 from one or more heater switch boxes 28.

Figure 9A:
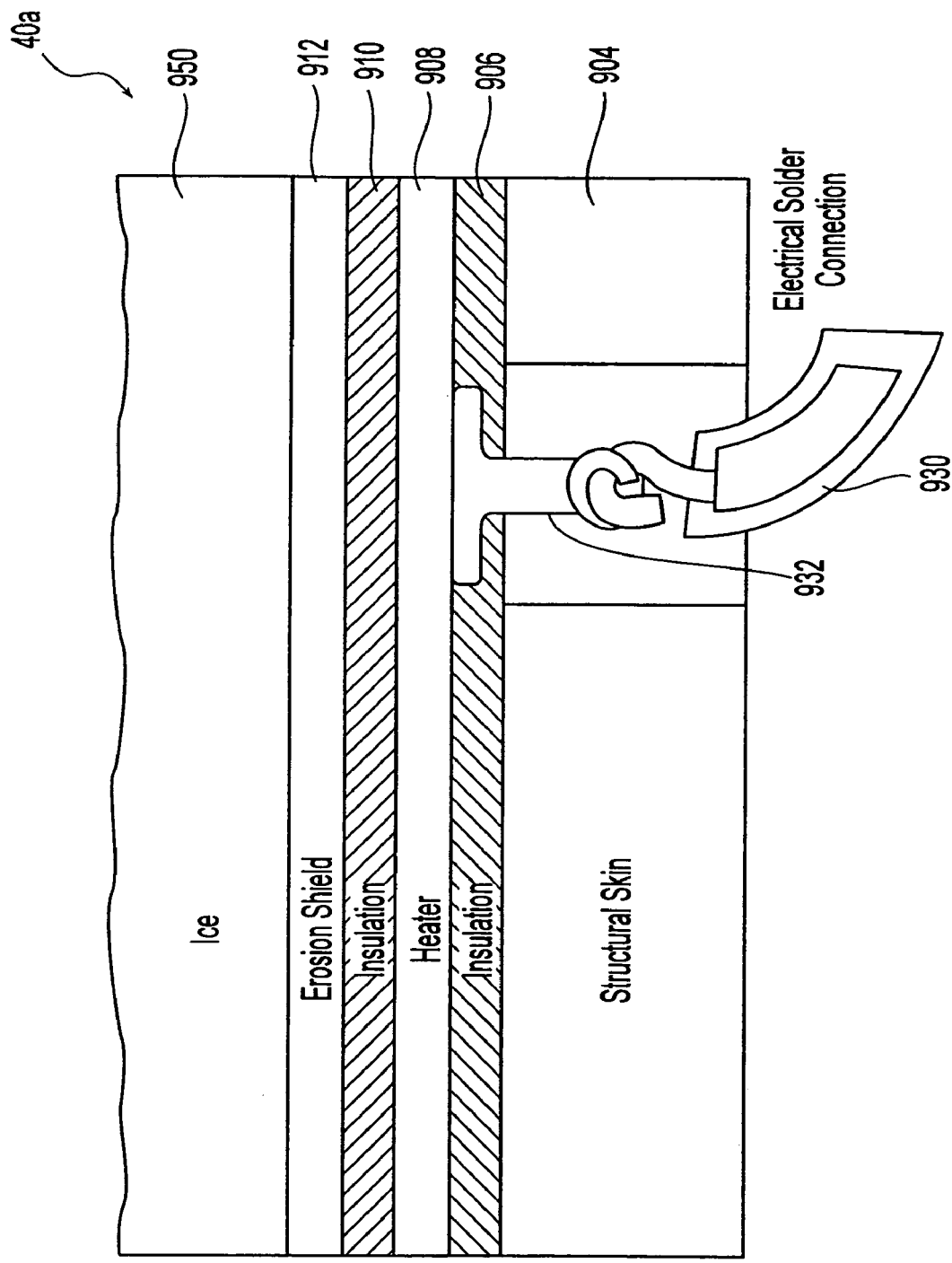
FIG. 9a shows a cross-sectional view of a cowling in which the heater is part of an inner layer of the cowling.

FIG. 9a shows a cross-section of an inlet cowling 40a in which the ice protection electrical heater is spaced apart from the ice 950 by one or more layers. The structural skin 904 of the cowling 40a provides support for the layers above. These layers include a first insulation layer 906, a heater layer 908 atop the first insulation layer, a second insulation layer 910 atop the heater layer 908, and an erosion shield 912 atop the second insulation layer 910. Heat from the heater layer 908 passes through the second insulation layer 910 and the erosion shield to melt the ice 950.

In one embodiment, the thickness of the inlet cowling is on the order of 0.1"-0.2". The structural skin 904 is formed of a metallic or composite material having a thickness between about 0.02" and 0.10"; the first insulation layer 906 is formed of an electrically inert (i.e., electrically insulative) material having a thickness between about 0.01" and 0.04"; the heater layer 908 comprises electrical heaters formed of a metallic or conductive material on a nonconductive plastic film or other substrate and having a thickness between about 0.005" and 0.020"; the second insulation layer 910 is formed of an electrically inert (i.e., electrically insulative) but thermally conductive material having a thickness between about 0.01" and 0.04"; and the erosion shield 912 comprises a thermally conductive metallic skin or coating having a thickness between about 0.002" and 0.020".

Figure 9B:
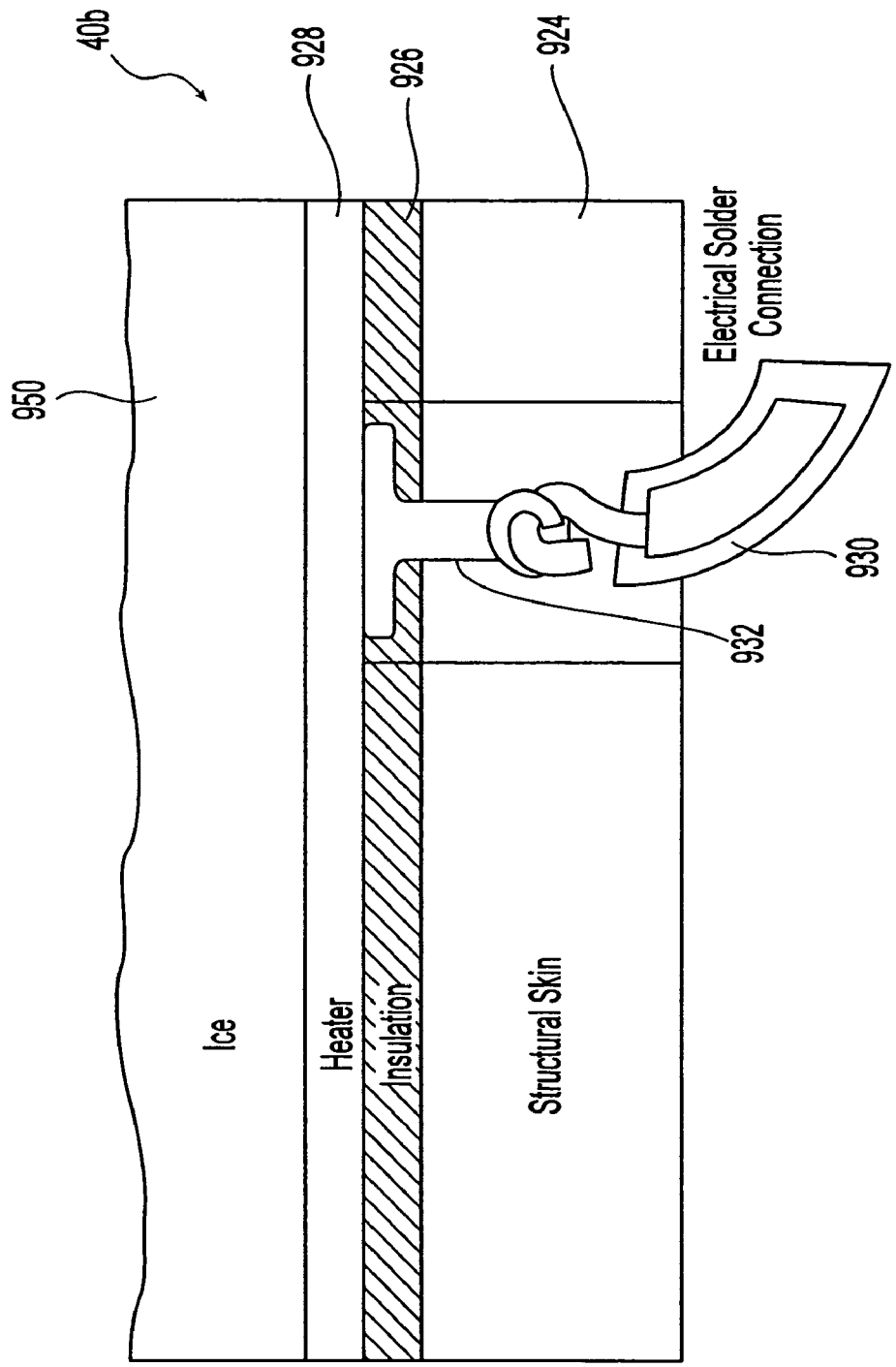
FIG. 9b shows a cross-sectional view of a cowling in which the heater is part of an outer layer of the cowling.

Instead of being mounted on the inner surface of the inlet cowling 40 as shown in FIGS. 4-6, the ice protection electrical heaters 908 may be mounted on the outer surface. When positioned on the outer surface, the ice protection electrical heaters are more directly exposed to the ice and so the energy efficiency of the system may improve. Through holes may be formed in some of the underlying layers of the cowling 40 at spaced apart intervals to accommodate wires and other connections to deliver current to the ice protection electrical heaters. FIG. 9b shows a cross-section of an inlet cowling 40b in which the heater forms the outer surface of the cowling 40b. Again, the structural skin 924 of the cowling 40b provides support for the layers above. These layers include a first insulation layer 926, and a heater layer 928 atop the first insulation layer 924, all having substantially the same composition and thickness ranges discussed above with respect to FIG. 9a. In this instance, however, the heater layer 928 is exposed to the elements and so must also serve as the erosion shield.

In both FIGS. 9a and 9b, a wire or cable 930 provides current to the heater layers 908, 928. preferably, the wire is connected to the heater via an electrical solder connection 932, as seen in these figures. It is understood in these figures that each of the heater layers may comprise multiple individual ice protection electrical heaters.

Engine inlets in accordance with the present invention may realize efficient ice protection with lower weight inlet structure, as compared to a conventional hot air thermal anti-ice (TAI) system. Furthermore, eliminating the pressures and temperatures associated with a traditional TAI system simplifies certain aspects of nacelle design. For instance, traditional split lines between the inlet major components are driven by the thermal anti-ice system and the acoustic requirements. The electrical system of the present invention generally does not rely upon these limitations and may therefore allow for these locations to be optimized for other design criteria. As an example, moving the traditional split line between the inlet lip and the outer barrel aft improves the aerodynamic performance of the inlet and allows the lip to be incorporated into a design that promotes natural laminar flow while also covering an access opening.

The above description of various embodiments of the invention is intended to describe and illustrate various aspects of the invention, and is not intended to limit the invention thereto. Persons of ordinary skill in the art will understand that certain modifications may be made to the described embodiments without departing from the invention. All such modifications are intended to be within the scope of the appended claims.

What is claimed is:

1. An aircraft engine nacelle comprising:
   an inner support comprising an outer barrel portion and an inner barrel portion connected to the outer barrel portion; and
   a removable inlet cowling attachable to the inner support, the removable inlet cowling having an outer lip, an inner lip, and a leading edge extending between the outer and inner lips, and at least one ice protection electrical heater associated with the leading edge of the removable inlet cowling; wherein:
   the outer barrel portion has at least one service access opening therein, and
   the outer lip covers the service access opening, when the inlet cowling is attached to the inner and outer barrel portions.

2. The aircraft engine nacelle according to claim 1, further comprising:
   ice protection electrical heating equipment that is:
   located between the inner barrel portion and the outer barrel portion, and
   accessible through said access opening, when the inlet cowling is detached from the inner and outer barrel portions.

3. The aircraft engine nacelle according to claim 2, wherein the electrical heating equipment comprises at least one heater switch box.

4. The aircraft engine nacelle according to claim 1, wherein the ice protection electrical heater comprises at least one parting strip heater positioned along a leading edge of the removable inlet cowling.

5. The aircraft engine nacelle according to claim 4, wherein the ice protection electrical heater further comprises a plurality of shed zone electrical heaters arranged side by side on either side of the parting strip electrical heater.

6. The aircraft engine nacelle according to claim 5, wherein the at least one parting strip electrical heater, and the plurality of shed zone electrical heaters, are arranged on an inner surface of the inlet cowling.

7. The aircraft engine nacelle according to claim 5, wherein the at least one parting strip electrical heater, and the plurality of shed zone electrical heaters, are arranged on an outer surface of the inlet cowling.

8. The aircraft engine nacelle according to claim 5, further comprising:
   at least one heater controller configured to selectively supply pulses of electrical power to the shed zone electrical heaters.

9. The aircraft engine nacelle according to claim 1, wherein an axial length of the outer lip is greater than an axial length of the inner lip.

10. The aircraft engine nacelle according to claim 1, wherein the inlet cowling has an aerodynamic profile that promotes laminar airflow across the outer lip.

11. The aircraft engine nacelle according to claim 1, wherein the inlet cowling comprises a plurality of arcuate inlet cowling segments.

12. The aircraft engine nacelle according to claim 11, wherein at least one of said plurality of inlet cowling segments comprises said outer lip that covers the at least one service access opening, when the inlet cowling is attached to the inner and outer barrel portions.

13. The aircraft engine nacelle according to claim 11, wherein the ice protection electrical heater comprises at least one parting strip heater positioned along a leading edge of at least one of said plurality of inlet cowling segments.

14. An electric ice protection system for an aircraft engine nacelle having an inner barrel and an outer barrel, the ice protection system comprising:
   an engine inlet cowling having an outer lip configured for engagement with at least a portion of the outer barrel, an inner lip configured for engagement with at least a portion of the inner barrel, and a leading edge extending between the outer and inner lips;
   at least one parting strip electrical heater attached to the cowling proximate to the leading edge; and
   a plurality of shed zone electrical heaters arranged side by side on either side of the parting strip electrical heater, wherein:
   the outer barrel has at least one service access opening therein, and
   the outer lip is configured to cover said at least one service access opening.

* * * * *